US011598878B2

(12) United States Patent
Mahajan et al.

(10) Patent No.: US 11,598,878 B2
(45) Date of Patent: Mar. 7, 2023

(54) VISION-CUED RANDOM-ACCESS LIDAR SYSTEM AND METHOD FOR LOCALIZATION AND NAVIGATION

(71) Applicant: Teledyne Scientific & Imaging, LLC, Thousand Oaks, CA (US)

(72) Inventors: Milind Mahajan, Thousand Oaks, CA (US); Weiya Zhang, Thousand Oaks, CA (US); Mark Anderson, Chapel Hill, NC (US); Mario Aguilar-Simon, Chapel Hill, NC (US); Brian Gregory, Newbury Park, CA (US)

(73) Assignee: TELEDYNE SCIENTIFIC & IMAGING, LLC, Thousand Oaks, CA (US)

(*) Notice: Subject to any disclaimer, the term of this patent is extended or adjusted under 35 U.S.C. 154(b) by 354 days.

(21) Appl. No.: 16/842,697

(22) Filed: Apr. 7, 2020

(65) Prior Publication Data

US 2021/0311195 A1 Oct. 7, 2021

(51) Int. Cl.
*G01S 17/58* (2006.01)
*B60W 30/095* (2012.01)
*G01S 17/931* (2020.01)
*G01S 7/481* (2006.01)
*G01S 17/89* (2020.01)
*G01S 19/01* (2010.01)

(52) U.S. Cl.
CPC ......... *G01S 17/931* (2020.01); *B60W 30/095* (2013.01); *G01S 7/4817* (2013.01); *G01S 17/58* (2013.01); *G01S 17/89* (2013.01); *G01S 19/01* (2013.01); *B60W 2420/52* (2013.01)

(58) Field of Classification Search
CPC .... G01S 17/58; G01S 17/931; G01S 17/4817; G01S 17/89; G01S 17/42; G01S 17/86; G01S 17/93; G01S 19/01; B60W 30/095
See application file for complete search history.

(56) References Cited

U.S. PATENT DOCUMENTS 9,476,983 B2   10/2016   Zeng
10,445,896 B1  10/2019   Bills et al.
10,591,601 B2   3/2020   Hicks et al.
(Continued)

OTHER PUBLICATIONS

Poulton et al., "Coherent solid-state LIDAR with silicon photonic optical phased arrays", Optics Letter, vol. 42, No. 20, Oct. 15, 2017, pp. 4091-4094.
(Continued)

*Primary Examiner* — Tan Q Nguyen
(74) *Attorney, Agent, or Firm* — K&L Gates LLP

(57) ABSTRACT

A vision-cued random-access LIDAR system and method which determines the location and/or navigation path of a moving platform. A vision system on a moving platform identifies a region of interest. The system classifies objects within the region of interest, and directs random-access LIDAR to ping one or more of the classified objects. The platform is located in three dimensions using data from the vision system and LIDAR. The steps of classifying, directing, and locating are preferably performed continuously while the platform is moving and/or the vision system's field-of-view (FOV) is changing. Objects are preferably classified using at least one smart-vision algorithm, such as a machine-learning algorithm.

35 Claims, 2 Drawing Sheets

(56) References Cited

U.S. PATENT DOCUMENTS

| | | |
|---|---|---|
| 11,113,584 B2 | 9/2021 | Deng et al. |
| 2005/0057741 A1 | 3/2005 | Anderson et al. |
| 2012/0044476 A1 | 2/2012 | Earhart et al. |
| 2019/0132572 A1* | 5/2019 | Shen ................ G01S 17/86 |
| 2019/0204423 A1* | 7/2019 | O'Keeffe ............ G01S 17/89 |
| 2019/0253701 A1* | 8/2019 | Himel ................. G01J 1/44 |
| 2020/0284607 A1* | 9/2020 | Mangal ............. G06V 20/584 |
| 2020/0284913 A1* | 9/2020 | Amelot ............. B60W 50/14 |
| 2021/0190914 A1* | 6/2021 | Kunz ................ G01S 17/08 |
| 2021/0362710 A1* | 11/2021 | Choi ................. B60W 40/06 |
| 2021/0389467 A1* | 12/2021 | Eshel ............... G01S 17/931 |

OTHER PUBLICATIONS

Premebida et al., "LIDAR and Vision-Based Pedestrian Detection System", Journal of Field Robotics, 26(9), pp. 696-711 (2009).

Hutchison et al., High-resolution aliasing-free optical beam steering, vol. 3, No. 8, Aug. 2016, Optica, pp. 887-890.

Zhang et al., A large-scale microelectromechanicalsystems-based silicon photonics LiDAR, Nature, vol. 603, Mar. 10, 2022, pp. 253-258.

Stockley et al., Advances in liquid crystal beam steering, Proceedings of SPIE vol. 5550, Free-Space Laser Communications IV, Oct. 20, 2004, pp. 32-39.

International Search Report and Written Opinion of the International Searching Authority for International Application No. PCT/US2021/022940 dated Jun. 15, 2021.

International Preliminary Report on Patentability for International Application No. PCT/US2021/022940 dated Oct. 6, 2022.

Wikipedia contributors, Lidar, Wikipedia, The Free Encyclopedia, Oct. 20, 2022, 21:41 UTC. Available at: https://en.wikipedia.org/w/index.php?title=Lidar&oldid=1117280124. Accessed Oct. 24, 2022.

* cited by examiner

VISION-CUED RANDOM-ACCESS LIDAR SYSTEM AND METHOD FOR LOCALIZATION AND NAVIGATION

GOVERNMENT RIGHTS

This invention was made with Government support under HR0011-16-C-0105 awarded by DARPA MOABB (Modular Optical Aperture Building Blocks). The Government has certain rights in the invention.

BACKGROUND OF THE INVENTION

Field of the Invention

This invention relates generally to systems and methods for determining the location of a moving platform with respect to selected reference features and planning a safe route for navigation.

Description of the Related Art

The field of autonomous vehicles is growing rapidly. Such vehicles, whether ground- or air-based, require technology to know where they are (localization) and where they are going (navigation).

A variety of technologies are used to provide the necessary information. For example, magnetometers can be used for localization and navigation, though they are not very accurate and tend to be EM-sensitive. Other physical sensors such as odometers are bulky and inflexible. GPS systems are prone to jamming, and work poorly indoors. Time-of-flight cameras might be employed, though they tend to be pixel-limited and have poor lateral resolution. Conventional scanning LIDAR might be considered, but this approach would be extremely inefficient, generates unnecessarily large amounts of data, and is not compatible with small platforms with high platform disturbance.

SUMMARY OF THE INVENTION

A vision-cued random-access LIDAR system and method are presented which addresses several of the problems noted above.

The method described herein is used to determine the location and/or navigation path of a moving platform. The method requires using a vision system on a moving platform to identify a region of interest, classifying objects within the region of interest, directing random-access LIDAR to ping one or more of the classified objects, and locating the platform in three dimensions using data from the vision system and LIDAR. The LIDAR pings may also be used to determine the orientation of classified objects within the region of interest.

The steps of classifying, directing, and locating are preferably performed continuously while the platform is moving and/or the vision system's field-of-view (FOV) is changing. Objects are preferably classified using at least one smart-vision algorithm, such as a machine-learning algorithm.

The present LIDAR system and method may also be used to determine the linear and/or angular acceleration and/or velocity of the platform. The LIDAR may be a coherent LIDAR, which can be employed to determine the velocities of the classified objects relative to the moving platform.

These and other features, aspects, and advantages of the present invention will become better understood with reference to the following drawings, description, and claims.

DETAILED DESCRIPTION OF THE INVENTION

The present system and method determines the location and/or navigation path of a moving platform. The invention has many possible applications. For example, the system and method could be used as part of an autonomously navigated ground or air vehicle. Such vehicles need a means of following a specified path, and of identifying and possibly avoiding obstacles along said path, such as electrical wires. Use of a vision system in combination with a random-access LIDAR as described herein can enable the vehicle to move at speeds of 50 mph or more. Another possible application is to provide location and/or navigation information in a GPS-denied environment. A random access LIDAR is defined as a LIDAR which is able to point its beam from any point within its addressable FOV to any other point within its addressable FOV extremely quickly (<1 ms), preferably without limits imposed by mechanical inertia (see, e.g., Poulton et al., Optics Letters Vol. 42, No. 20/Oct. 15, 2017).

Figure 1:
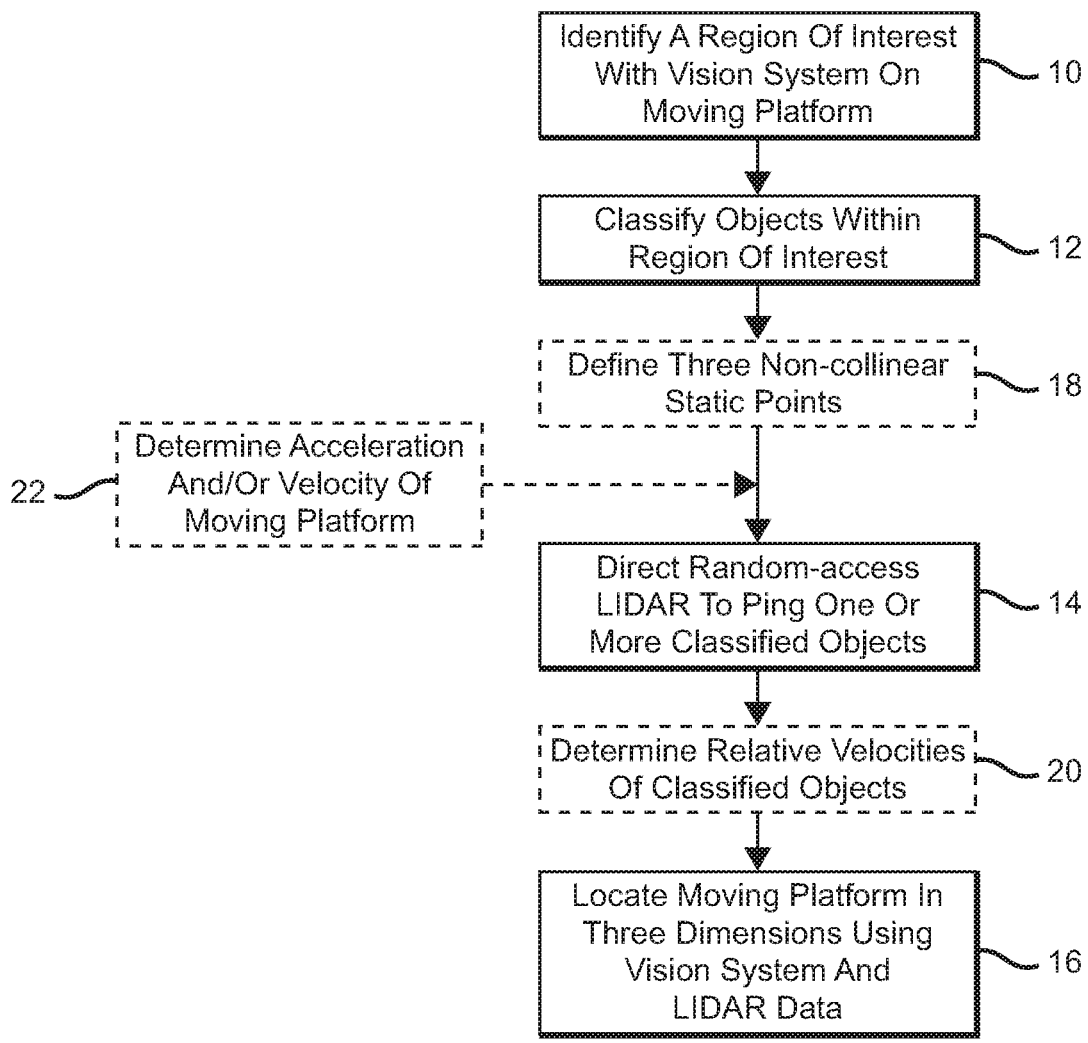
FIG. 1 is a flow diagram illustrating one possible version of the method described herein.

In brief, the present system and method uses a vision system to cue random-access LIDAR to determine the location of a moving platform with respect to selected reference features; the reference features are preferably continuously identified and renewed—preferably using a smart-vision algorithm—when the platform moves and/or the FOV changes. A simplified illustration of the present method is shown in FIG. 1. The method comprises:

using a vision system on a moving platform to identify a region of interest (step 10);
  classifying objects within the region of interest (12);
  directing random-access LIDAR to ping one or more of the classified objects (14); and
  locating the platform in three dimensions using data from the vision system and the LIDAR (16).

A system in accordance with the present invention (illustrated in FIG. 2) includes a software-based processor (36) which receives data from the vision system and classifies objects within the region of interest. The LIDAR may optionally be used to determine the orientation of classified objects within the region of interest.

The steps of classifying objects within the region of interest, directing random-access LIDAR to ping one or more of the classified objects, and locating the platform in three dimensions using data from the vision system and the LIDAR is preferably performed continuously while the platform is moving and/or the vision system's FOV is changing. One way in which this may be done is by operating the vision system such that it captures images of the region of interest with a known interval between image captures, and then defining at least 3 non-collinear static points (18) within the region of interest to be used as common reference points for each image capture. The interval between image captures is preferably such that subsequent images have common features sufficient to allow the selection of at least 3 non-collinear features as common reference points. As old reference points move out of the FOV, new reference features are added. Note that if more than 3 non-collinear features are available, the redundancy may serve to increase system accuracy. Further note that the vision system and the random-access LIDAR may be calibrated to establish a predetermined relationship between their respective FOVs.

The objects within the region of interest may be classified using, for example, at least one smart-vision algorithm such as a machine-learning algorithm. Here, for example, at least 3 non-collinear static points may be defined within the region of interest to be used as common reference points for each image capture, with the classifications of the objects via smart-vision algorithm used to select the static reference points.

The LIDAR preferably provides a narrow beam, and is pointed electro-optically to provide the necessary random access. The LIDAR is preferably a coherent LIDAR, which may be used to determine the velocities of the objects within the region of interest relative to the moving platform (20). The coherent LIDAR can measure the velocity of a classified object using the Doppler Effect, thereby eliminating the need to compare two range measurements to get longitudinal speed. If an object is stationary (say a traffic sign), then the measurement would be the velocity of the platform itself. Coherent LIDAR can also be arranged to report vibration signatures of a target, in addition to amplitude and phase, which can be used by the processor software during the classifying process.

The processor software may also be arranged to use multiple points on classified objects of interest to orient the object in a correct pose. The classified objects and poses may be used to build a 3D model of the world, which can be used to determine routes that are available for navigation to the next waypoint.

Previous systems that employ scanning LIDAR tend to be overloaded with incoming data. The present combination of a vision system which identifies regions of interest and images objects within the regions, which cues random-access LIDAR to ping classified objects within the region of interest, enables 3-D position data to be obtained, in real time.

The random-access LIDAR may be arranged to perform multiple functions simultaneously, based on a priority scheme established by processor software. These functions may include:
  scanning in the forward direction to detect obstacles;
  feed-forward stabilization to compensate for platform disturbance (discussed below); and
  range points per cues received from software interrogating objects of interest.

There are at least two ways to determine that an object within the region of interest is static. One way is to measure the velocity of the object, using coherent LIDAR, for example, and compare object velocity with platform velocity measured using, for example, an inertial measurement unit (IMU). In this way, it can be determined if the object is stationary. When so arranged, the at least 3 non-collinear static points within the region of interest to be used as common reference points for each image capture can be selected using the relative velocities of the objects, as measured using coherent LIDAR.

A second method involves the use of a smart-vision algorithm for object classification as mentioned above. If an object within the region of interest is classified as, for example, a tree, or a traffic sign, using a smart-vision algorithm, for example, it may be considered static, as certain classes of objects are inherently static.

The vision system required by the present method may operate in the visible and/or thermal portions of the spectrum. One or more cameras may be used, preferably having a high resolution. The random-access LIDAR preferably has a narrow instantaneous FOV (IFOV) that can be steered from any point in a wide field of regard to any other point is the FOV is a short period of time. The IFOV is suitably 10 µRad-10 mRad, with a field-of-regard of >10 deg and a repointing time of 1 µs-1 ms. The LIDAR preferably produces a diffraction limited beam.

The present method of determining the location and/or navigation path of a moving platform may further comprise determining the linear and/or angular acceleration and/or velocity of the platform (22). The required vision system preferably controls the pointing of the LIDAR used to ping one or more classified objects. When so arranged, the linear and/or angular acceleration and/or velocity may be employed to apply correction to the LIDAR to maintain stable pointing as directed by the vision system in the presence of platform motion and latency between vision and LIDAR. A predefined scan can also be used to effectively increase the spot size on a detected object or a potential target for the range measurement, and thereby reduce pointing accuracy requirement.

As noted above, the vision system preferably controls the pointing of the LIDAR used to ping one or more classified objects. The present method may further comprise executing an additional pre-defined LIDAR scan pattern in parallel with the vision-directed LIDAR pinging. This additional scan is suitably performed by the same random-access LIDAR used to ping the classified objects. The additional predefined forward LIDAR scan (28 in FIG. 2b) is preferably along the direction of platform motion and serves to provide back-up obstacle avoidance.

Figure 2A:
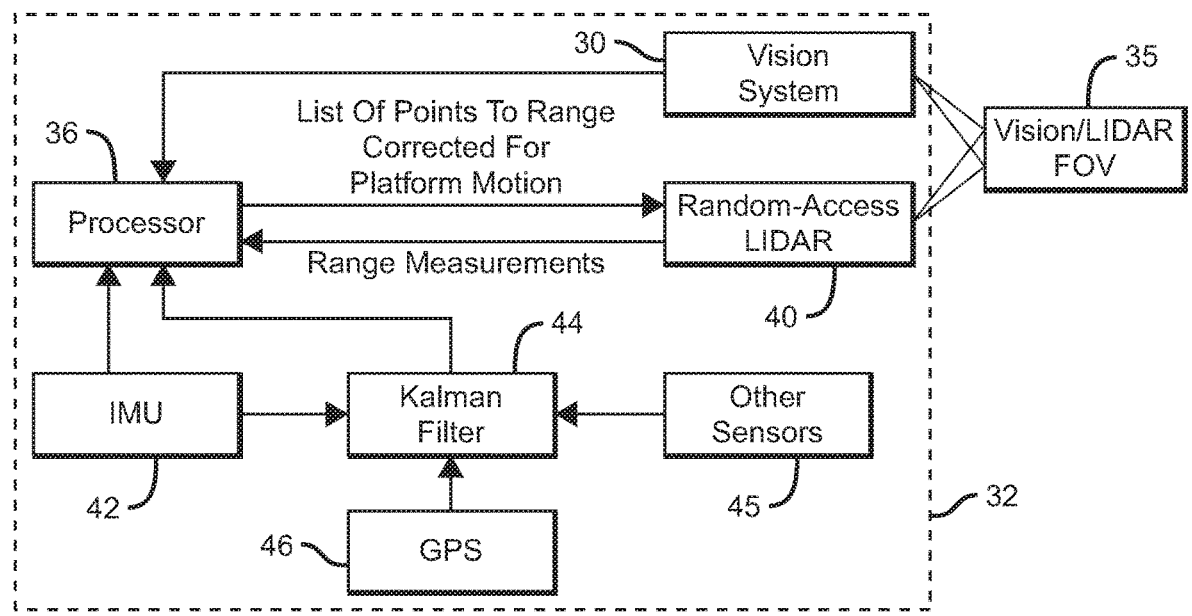
FIGS. 2a and 2b are block diagrams illustrating one possible embodiment of the system described herein.
Figure 2B:
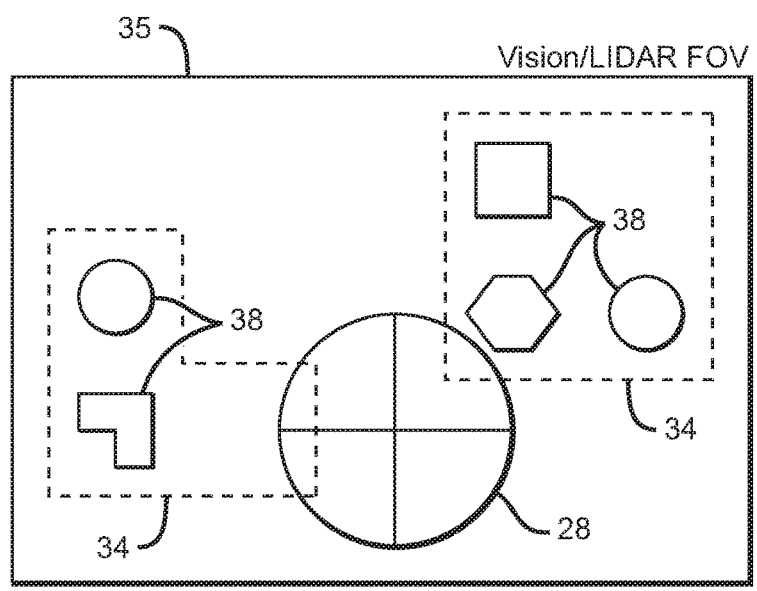

A simplified block diagram of a system for determining the location and/or navigation path of a moving platform as described herein is shown in FIGS. 2a and 2b. The system includes a vision system 30 on a moving platform 32 arranged to identify a region of interest 34 within a common vison/LIDAR FOV 35. The system includes a processor 36 arranged to receive images captured by vision system 30 and classify objects 38 within region of interest 34. The system also requires a random-access LIDAR 40, which may be a coherent LIDAR, arranged to ping one or more of classified objects 38. The processor 36 provides a list of points with coordinates corrected for the platform motion to LIDAR 40, and the LIDAR provides corresponding range measurements to processor 36. Processor 36 is further arranged to locate platform 32 in three dimensions using data from vision system 30 and LIDAR 40.

The system is preferably arranged such that the locating is performed continuously while platform 32 is moving and/or the field-of-view (FOV) of vision system 30 is changing. As noted above, vision system 30 may be arranged to capture images of region of interest 34 with a known interval between image captures, with the system further arranged to define at least 3 non-collinear static points within region of interest 34 to be used as common reference points for each image capture.

Processor 34 preferably uses at least one smart-vision algorithm to classify objects 38, such as a machine-learning algorithm. Using trained machine-learning algorithms for navigation reduces data collection and processing overheads. Data defining certain types of objects may be accumulated before the system is deployed; processor software can then maintain and update a library of objects of interest, detected in real time, as a function of time. "Objects of interest" are physical objects or parts of objects that are of interest as potential obstacles, targets, or navigation features for localization within the moving platform's environment.

As the old objects of interest move out of the FOV, new reference points are added and used. The processor software may include a trained machine-learning "classifier" algorithm that identifies and classifies objects of interest. The software may be arranged to select reference features for localization that are parts of objects from classes that are most likely to be stationary and have sufficient contrast (e.g. a window or the entrance of a building, electricity poles, etc.).

Stationary reference features are confirmed to be stationary by, for example, comparing measured platform movement with camera pixel movement and corresponding range measurements—performed with random-access LIDAR—between two or more temporal instances. Corresponding angular and linear displacements may be measured by IMU. Relative angular positions and distances from multiple (>3) stationary reference features may be used to determine system location and attitude.

Vision system 30 is suitably arranged to operate in the visible and/or thermal portions of the spectrum. LIDAR 40 suitably has an instantaneous field-of-view (IFOV) of 10 µRad-10 mRad, a field-of-regard of >10 deg, a repointing time of 1 µs-1 ms, and is arranged to produce a diffraction limited beam.

The present system enables localization without an IMU. However, the system may further comprise an IMU 42, arranged to determine linear and/or angular acceleration and/or velocity of platform 32. When so arranged, vision system 30, LIDAR 40, and IMU 42 are preferably time synchronized using, for example, an onboard clock or an external reference such as GPS. The platform would typically be localized on a periodic basis. IMU 42 can be used to correct platform disturbance-induced errors in LIDAR pointing due to time lag between camera image captures and LIDAR range data acquisition. This time lag is preferably <100 ms. Since IMUs tend to drift, the time between localizations—i.e., the temporal difference used for differentiating stationary objects from moving objects—is preferably small (<1 sec.). These techniques could be used to provide feed-forward correction and line-of-sight stabilization, which enables high accuracy pointing in the presence of severe platform disturbance. Stabilized pointing allows ranging small reference features, increasing localization accuracy in transverse (perpendicular to longitudinal, line-of-sight) directions.

A global positioning system (GPS) unit 46 may also be included, arranged to update absolute world position of platform 32. The system may also include a Kalman filter 44 to estimate location and orientation using all available sensor measurements over a period of time, which may also receive inputs from one or more other sensors 45, such as a compass magnetometer.

The camera IFOV, which is an angular projection of a single camera pixel in the image, and the LIDAR resolution are preferably designed to have comparable longitudinal and transverse distance measurement accuracy at the range limit of the LIDAR (e.g., nominally 2 cm at a distance of 100 m).

The present system and method for determining the location and/or navigation path of a moving platform is particularly advantageous for use on small platforms with challenging disturbance environments (e.g., a fixed wing unmanned air vehicle), and platforms with size, weight, power, and/or processing power limitations. It is capable of being more accurate than a magnetometer, and is not EM-sensitive. In addition, the invention is more compact and flexible that other physical sensors such as odometers. The system does not require contact with a surface as does an odometer, and does not require setting up an external reference source like an RF or ultrasound triangulation-based system. Using selected features and random-access LIDAR, the data and computation burden of the process is heavily reduced and the speed is significantly improved. Vision/LIDAR-based localization as described herein can be very accurate, with accuracy largely determined by the accuracy of the LIDAR and camera IFOV.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of determining the location and/or navigation path of a moving platform, comprising:
    using a vision system on a moving platform to identify a region of interest;
    classifying objects within said region of interest;
    directing random-access LIDAR to ping one or more of said classified objects;
    locating said platform in three dimensions using data from said vision system and said LIDAR.

2. The method of claim 1, wherein said vision system and said random-access LIDAR have respective fields-of-view (FOVs), and are calibrated to establish a predetermined relationship between said respective FOVs.

3. The method of claim 1, where said LIDAR pings are used to determine the orientation of classified objects within said region of interest.

4. The method of claim 1, wherein said steps of classifying, directing, and locating are performed continuously while said platform is moving and/or said vision system's field-of-view (FOV) is changing.

5. The method of claim 4, wherein said vision system captures images of said region of interest with a known interval between image captures, further comprising defining at least 3 non-collinear static points within said region of interest to be used as common reference points for each image capture.

6. The method of claim 1, wherein said step of classifying objects comprises the use of at least one smart-vision algorithm.

7. The method of claim 6, further comprising defining at least 3 non-collinear static points within said region of interest to be used as common reference points for each image capture, wherein the classifications of said objects are used to select said static reference points.

8. The method of claim 6, wherein at least one of said smart-vision algorithms is a machine-learning algorithm.

9. The method of claim 1, wherein said LIDAR is a coherent LIDAR, further comprising determining the velocities of said objects relative to said moving platform using said coherent LIDAR.

10. The method of claim 9, further comprising defining at least 3 non-collinear static points within said region of interest to be used as common reference points for each image capture, wherein the relative velocities of said objects are used to select said static reference points.

11. The method of claim 1, wherein said vision system operates in the visible and/or thermal portions of the spectrum.

12. The method of claim 1, wherein said LIDAR has an instantaneous field-of-view (IFOV) of 10 µRad-10 mRad.

13. The method of claim 1, wherein said LIDAR has a field-of-regard of >10 deg.

14. The method of claim 1, wherein said LIDAR has a repainting time of 1 µs-1 ms.

15. The method of claim 1, wherein said LIDAR produces a diffraction limited beam.

16. The method of claim 1, further comprising determining the linear and/or angular acceleration and/or velocity of said platform.

17. The method of claim 16, wherein said vision system controls the pointing of said LIDAR used to ping one or more of said classified objects, further comprising using said linear and/or angular acceleration and/or velocity to apply correction to said LIDAR to maintain stable pointing as directed by said vision system.

18. The method of claim 1, wherein said vision system controls the pointing of said LIDAR used to ping one or more of said classified objects,
said method further comprising executing an additional pre-defined LIDAR scan pattern in parallel to said vision-directed LIDAR pinging.

19. The method of claim 18, wherein said predefined LIDAR scan is along the direction of the platform motion and serves to provide back-up obstacle avoidance.

20. The method of claim 18, wherein said predefined LIDAR scan is used to effectively increase the LIDAR'S spot size on a detected object.

21. A system for determining the location and/or navigation path of a moving platform, comprising:
a vision system on a moving platform arranged to identify a region of interest;
a processor arranged to receive images captured by said vision system and classify said objects within said region of interest;
a random-access LIDAR arranged to ping one or more of said classified objects;
said processor further arranged to locate said platform in three dimensions using data from said vision system and said LIDAR.

22. The system of claim 21, further arranged such that said locating is performed continuously while said platform is moving and/or said vision system's field-of-view (FOV) is changing.

23. The system of claim 22, wherein said vision system captures images of said region of interest with a known interval between image captures, said system further arranged to define at least 3 non-collinear static points within said region of interest to be used as common reference points for each image capture.

24. The system of claim 21, wherein said processor uses at least one smart-vision algorithm to classify said objects.

25. The system of claim 24, wherein at least one of said smart-vision algorithms is a machine-learning algorithm.

26. The system of claim 21, wherein said LIDAR is a coherent LIDAR.

27. The system of claim 21, wherein said vision system is arranged to operate in the visible and/or thermal portions of the spectrum.

28. The system of claim 21, wherein said LIDAR has an instantaneous field-of-view (IFOV) of 10 µRad-10 mRad.

29. The system of claim 21, wherein said LIDAR has a field-of-regard of >10 deg.

30. The system of claim 21, wherein said LIDAR has a repainting time of 1 µs-1 ms.

31. The system of claim 21, wherein said LIDAR is arranged to produce a diffraction limited beam.

32. The system of claim 21, further comprising an inertial measurement unit (IMU) arranged to determine linear and/or angular acceleration and/or velocity of said platform.

33. The system of claim 32, wherein said vision system, said LIDAR, and said IMU are time synchronized.

34. The system of claim 33, further comprising a Kalman filter.

35. The system of claim 21, further comprising a global positioning system (GPS) unit arranged to provide absolute world position of said platform.

* * * * *